United States Patent
Raeker et al.

(10) Patent No.: US 11,697,243 B2
(45) Date of Patent: Jul. 11, 2023

(54) FUSED FILAMENT FABRICATION METHOD USING FILAMENTS THAT INCLUDE A BINDER CONFIGURED TO RELEASE A SECONDARY MATERIAL

(71) Applicant: Rolls-Royce Corporation, Indianapolis, IN (US)

(72) Inventors: Evan Raeker, Ann Arbor, MI (US); Quinlan Yee Shuck, Indianapolis, IN (US); Scott Nelson, Carmel, IN (US); Raymond Ruiwen Xu, Carmel, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 20 days.

(21) Appl. No.: 17/097,940

(22) Filed: Nov. 13, 2020

(65) Prior Publication Data
US 2021/0146605 A1    May 20, 2021

Related U.S. Application Data (60) Provisional application No. 62/935,351, filed on Nov. 14, 2019.

(51) Int. Cl.
*B29C 64/118*  (2017.01)
*B29C 64/245*  (2017.01)
(Continued)

(52) U.S. Cl.
CPC ............ *B29C 64/118* (2017.08); *B28B 1/001* (2013.01); *B29C 64/245* (2017.08); *B33Y 70/00* (2014.12); *B29K 2077/00* (2013.01); *B29K 2103/06* (2013.01); *B29K 2283/00* (2013.01); *B33Y 10/00* (2014.12)

(58) Field of Classification Search
CPC combination set(s) only.
See application file for complete search history.

(56) References Cited

U.S. PATENT DOCUMENTS

| 2003/0156964 | A1* | 8/2003 | Kikuchi | C22C 1/0441 419/34 |
| 2004/0018107 | A1* | 1/2004 | Khoshnevis | B33Y 10/00 425/78 |

(Continued)

FOREIGN PATENT DOCUMENTS

CN    1079179 A  * 12/1993  ............ C22C 1/051

OTHER PUBLICATIONS

CN 1079179 detailed translation (Year: 2022).*

*Primary Examiner* — Xiao S Zhao
*Assistant Examiner* — Guy F Mongelli
(74) *Attorney, Agent, or Firm* — Shumaker & Sieffert, P.A.

(57) ABSTRACT

A method may include fused filament fabricating a fused filament fabricated component by delivering a softened filament to selected locations at or adjacent to a build surface. The softened filament may include a binder and a primary material. The binder is configured to release a secondary material upon heating at or above a conversion temperature. The method also may include heating the fused filament fabricated component to a temperature at or above the conversion temperature to sinter the primary material to form a sintered part and cause the binder to release the secondary material within the sintered part.

17 Claims, 4 Drawing Sheets

(51) Int. Cl.
*B33Y 70/00* (2020.01)
*B28B 1/00* (2006.01)
*B29K 283/00* (2006.01)
*B33Y 10/00* (2015.01)
*B29K 103/06* (2006.01)
*B29K 77/00* (2006.01)

(56) References Cited

U.S. PATENT DOCUMENTS

| | | | |
|---|---|---|---|
| 2004/0151935 A1* | 8/2004 | Dzugan | C22C 1/1036 428/539.5 |
| 2004/0182202 A1* | 9/2004 | Geving | C22C 33/02 75/252 |
| 2004/0182510 A1* | 9/2004 | Pfeifer | B22F 3/004 156/272.8 |
| 2005/0087903 A1* | 4/2005 | Farr | C04B 35/447 425/375 |
| 2006/0086434 A1* | 4/2006 | Cornie | B05B 7/1409 118/325 |
| 2015/0008046 A1* | 1/2015 | Cuillier De Maindreville | E21B 10/55 175/426 |
| 2015/0014885 A1* | 1/2015 | Hofmann | B29C 64/393 425/375 |
| 2016/0024293 A1* | 1/2016 | Nestle | B29C 64/165 524/439 |
| 2017/0297111 A1* | 10/2017 | Myerberg | B33Y 40/20 |
| 2018/0071819 A1* | 3/2018 | Connor | B33Y 10/00 |
| 2018/0243988 A1* | 8/2018 | Lewicki | B33Y 50/02 |
| 2018/0250738 A1* | 9/2018 | Nakamura | B22F 3/225 |
| 2019/0168306 A1* | 6/2019 | Viault | F16H 53/06 |
| 2020/0338819 A1* | 10/2020 | Hinch | B33Y 70/00 |

* cited by examiner

FUSED FILAMENT FABRICATION METHOD USING FILAMENTS THAT INCLUDE A BINDER CONFIGURED TO RELEASE A SECONDARY MATERIAL

This application claims the benefit of U.S. Provisional Application No. 62/935,351, titled. "FUSED FILAMENT FABRICATION OF COMPONENT USING FILAMENT THAT INCLUDES A BINDER CONFIGURED TO RELEASE A SECONDARY MATERIAL", filed Nov. 14, 2019, which is incorporated herein by reference in its entirety.

TECHNICAL FIELD

The disclosure relates to additive manufacturing techniques, in particular, to additive manufacturing of metal, alloy, or ceramic components.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling or fused filament fabrication, in which heated material, such as polymer, is extruded from a nozzle and cools to be added to the structure.

SUMMARY

In some examples, the disclosure describes a technique that includes fused filament fabricating a fused filament fabricated component by delivering a softened filament to selected locations at or adjacent to a build surface. The softened filament may include a binder and a primary material. The binder is configured to release a secondary material upon heating at or above a conversion temperature. The method also may include heating the fused filament fabricated component to a temperature at or above the conversion temperature to sinter the primary material to form a sintered part and cause the binder to release the secondary material within the sintered part.

In some examples, the disclosure describes a filament for fused filament fabrication. The filament may include a primary material; and a binder. The binder is configured to release a secondary material upon heating at or above a conversion temperature.

In some examples, the disclosure describes a technique that includes fused filament fabricating a fused filament fabricated component by delivering a softened filament to selected locations at or adjacent to a build surface. The softened filament may include a binder and a powder comprising a metal or alloy. The binder is configured to release an alloying element upon heating at or above a conversion temperature. The method also may include heating the fused filament fabricated component to a temperature at or above the conversion temperature to sinter the powder to form a sintered part and cause the binder to release the alloying element within the sintered component.

In some examples, the disclosure describes a filament for fused filament fabrication. The filament may include a powder comprising a metal or alloy; and a binder, wherein the binder is configured to release an alloying element upon heating at or above a conversion temperature.

In some examples, the disclosure describes a fused filament fabricated component that includes a first filament at a first set of locations. The first filament includes a binder and a primary material. The binder is configured to release a secondary material upon heating at or above a conversion temperature. The fused filament fabricated component also includes a second filament at a second set of locations. The second filament includes a sacrificial binder and the primary material. The sacrificial binder is configured to be substantially fully removed from the fused filament fabricated component.

In some examples, the disclosure describes a fused filament fabricated component that includes a first filament at a first set of locations. The first filament includes a binder and a powder comprising a metal or alloy. The binder is configured to release an alloying component upon heating at or above a conversion temperature. The fused filament fabricated component also includes a second filament at a second set of locations. The second filament comprises a sacrificial binder and the powder. The sacrificial binder is configured to be substantially fully removed from the fused filament fabricated component.

The details of one or more examples are set forth in the accompanying drawings and the description below. Other features, objects, and advantages will be apparent from the description and drawings, and from the claims.

DETAILED DESCRIPTION

The disclosure generally describes techniques for forming components using fused filament fabrication (FFF). In the techniques of this disclosure, the filament used in the FFF process includes a primary material and a binder that is configured to release a secondary material, such as a metal, ceramic, or the like, upon exposure to heat. During sintering of a fused filament fabricated component, the binder releases the secondary material, which becomes part of the sintered component.

Additive manufacturing of metal or alloy components may present unique challenges, for example, compared to additive manufacturing of polymeric components. For example, while techniques such as powder bed fusion (including direct metal laser sintering, electron beam melting, selective laser sintering, or the like) which use a directed energy beam to fuse and sinter material may be useful in additive manufacturing, some alloys or ceramics may respond to energy beams in a manner that may not be conducive to localized melting or localized sintering. Further, powder bed fusion may leave residual unfused or unsintered powder residue, for example, within channels or hollow internal passages of an additively manufactured component. Powder bed fusion of high temperature alloys may also result in components that may be prone to cracking due to localized melting and thermal gradients.

In some examples, a material including a binder and a primary material dispersed in the binder may be deposited using fused filament fabrication to form a fused filament fabricated component. The primary material may include, for example, a metal, an alloy, a ceramic, carbon, or combinations thereof.

After additively forming one or more layers of the fused filament fabricated component, or after forming the entire component, the fused filament fabricated component may be heated to sinter the primary material. During the heating, the binder may release a secondary material. The secondary material may be an alloying element, a reactive element, or a material that forms a secondary phase within the primary material (such as a ceramic). In this way, the secondary material may modify one or more properties of the component, such as improving wear resistance, surface hardness, composition, or the like. By using the material including the binder and the primary material, removing the binder to leave the secondary material, and sintering the primary material, high-melt temperature alloys or ceramics may be used, residual (free) powder may be reduced, crack propensity may be reduced due to the absence of melting, and/or selected portions of the component may be modified using the secondary material. Further, microstructure of the additively manufactured component may be more carefully controlled by controlling microstructure of the primary material and avoiding melting of the primary material during processing.

Figure 1:
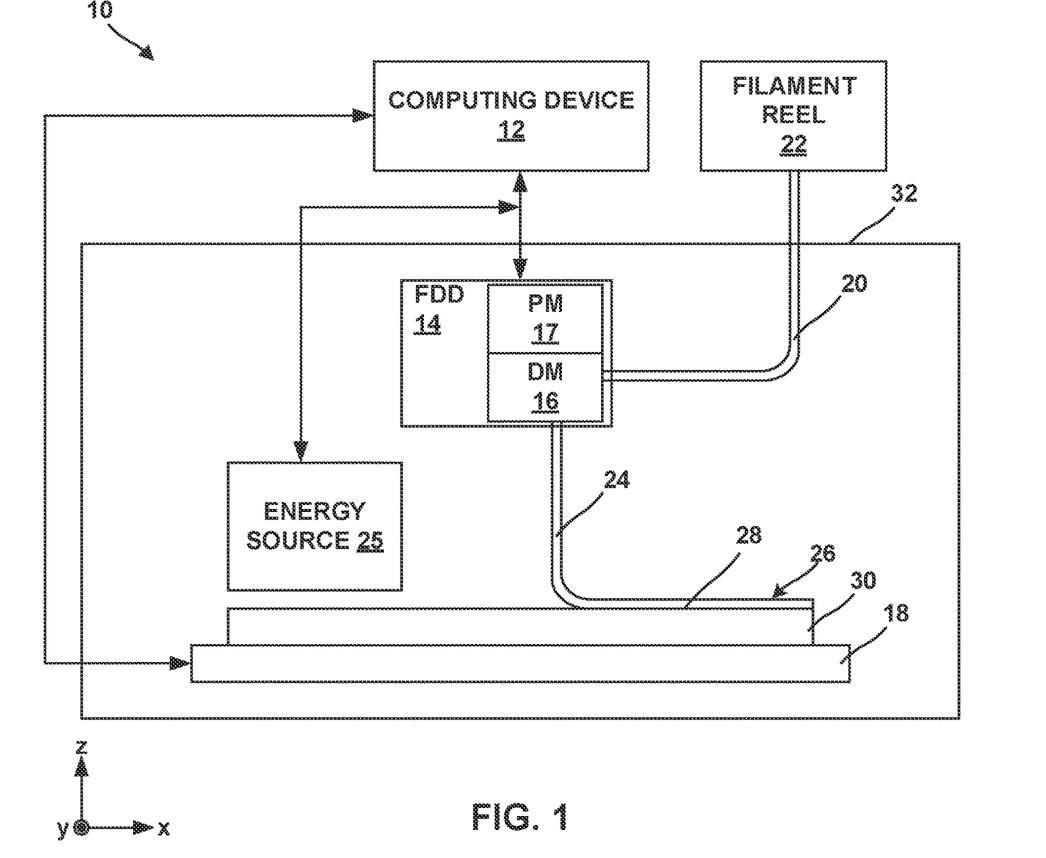
FIG. 1 is a conceptual block diagram illustrating an example system for forming an additively manufactured component by fused filament fabrication of a material including a primary material and a binder.

FIG. 1 is a conceptual block diagram illustrating an example fused filament fabrication system 10 for performing fused filament fabrication to form an additively manufactured component including a primary material and a binder by filament delivery. Additive manufacturing system 10 may include computing device 12, filament delivery device 14, enclosure 32, and stage 18.

Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Filament delivery device (FDD) 14 may include, for example, a delivery mechanism (DM) 16 for delivering a filament 20 to or near stage 18, and an optional positioning mechanism (PM) 18. Filament delivery device 14 may advance filament 20 from a filament reel 22 and heat filament 20 to above a softening or melting point of a component of filament 20 (e.g., a polymeric binder) to form a softened filament 24. Softened filament 24 is then extruded from delivery mechanism 16 and laid down in a road 26 on a major surface 28 of a substrate 30 (or, in subsequent layers, on a previously deposited road). The softened filament 34 cools and, in this way, is joined to other roads.

Substrate 30 may include a build plate on stage 18, or any suitable substrate defining a build surface. For example, substrate 30 may include a metal or glass plate defining a substantially planar surface. In other examples, substrate 30 may include surface features or a shaped (e.g., curved or curvilinear) surface on which the additively manufactured component is manufactured. In some examples, system 10 may not include a separate substrate 30, and filament delivery device 14 may deposit softened filament 24 on a build surface defined by stage 18, or on another component, or on layers of prior softened filament 24 or another material.

In some examples, filament delivery device 14 may, instead of receiving filament 20 from filament reel 22, include a chamber that holds a volume of a composition. The composition may be flowable, extrudable, or drawable from filament delivery device 14, for example, from delivery mechanism 16, in the form of softened filament 24 that may be deposited on or adjacent stage 18 or substrate 30. Softened filament 24 of the composition may be dried, cured, or otherwise solidified to ultimately form an additively manufactured component. In some examples, system 10 may include an energy source 25 configured to deliver energy to softened filament 24 to cure softened filament 24, for example, by photocuring or thermally curing the composition of softened filament 24.

Computing device 12 may be configured to control relative movement of filament delivery device 14 and/or stage 18 to control where filament delivery device 14 delivers softened filament 24. For example, stage 18 may be movable relative to filament delivery device 14, filament delivery device 14 may be movable relative to stage 18, or both. In some implementations, stage 18 may be translatable and/or rotatable along at least one axis to position substrate 30 relative to filament delivery device 14. For instance, stage 18 may be translatable along the z-axis shown in FIG. 1 relative to filament delivery device 14. Stage 18 may be configured to selectively position and restrain substrate 30 in place relative to stage 18 during manufacturing of the additively manufactured component.

Similarly, filament delivery device 14 may be translatable and/or rotatable along at least one axis to position filament delivery device 14 relative to stage 18. For example, filament delivery device 14 may be translatable in the x-y plane shown in FIG. 1, and/or may be rotatable in one or more rotational directions. Filament delivery device 14 may be translated using any suitable type of positioning mechanism 17, including, for example, linear motors, stepper motors, or the like.

Computing device 12 may be configured control movement and positioning of filament delivery device 14 relative to stage 18, and vice versa, to control the locations at which roads 26 are formed. Computing device 12 may be configured to control movement of filament delivery device 14, stage 18, or both, based on a computer aided manufacturing or computer aided design (CAM/CAD) file. For example, computing device 12 may be configured to control filament delivery device 14 (e.g., positioning mechanism 17) to trace a pattern or shape to form a layer including a plurality of roads on surface 38. Computing device 12 may be configured to control filament delivery device 14 or stage 18 to move substrate 30 away from filament delivery device 14, then control filament delivery device 14 to trace a second pattern or shape to form a second layer including a plurality of roads 26 on the first layer. Computing device 12 may be configured to control stage 18 and filament delivery device 14 in this manner to result in a plurality of layers, each layer including a traced shape or design. Together, the plurality of layers defines an additively manufactured component.

System 10 also includes an enclosure 32 that at least partially encloses filament delivery device 14 and stage 18, and optionally, energy source 25. In some examples, enclosure 32 substantially fully encloses delivery device 14 and stage 18, such that the environment within enclosure 32 may be controlled. In some examples, enclosure 32 includes or is coupled to a heat source configured to heat the interior environment of enclosure 32, a gas source and/or pump configured to control an atmospheric composition of the interior environment of enclosure 32, or the like. In this way, enclosure 32 may protect filament 20 and softened filament 24 during formation of the additively manufactured component, e.g., from unwanted chemical reactions that may change properties of the primary material and/or binder.

Filament reel 22 holds a filament 20 having a selected composition. In some examples, system 10 includes a single filament reel 22 holding a single filament 20 having a single composition. In other examples, system 10 may include multiple filament reels 22, each filament reel holding a filament 20 having a selected composition. Regardless of the number of filaments 20 and filament reels 22, each filament may include a primary material and a binder configured to bind the primary material in filament 20. The primary material may be in form of a powder, particles, whiskers, platelets, fibers, a continuous monofilament or multifilament two-dimensional or three-dimensional weave, braid, fabric, or the like.

The primary material may include any suitable ceramic, metal, alloy, or combinations thereof for forming an additively manufactured component. In some examples, the primary material include a high-performance metal or alloy for forming component used in mechanical systems, such as a steel (e.g., stainless steel) or other iron-based alloy, a nickel-based alloy, a cobalt-based alloy, a titanium-based alloy, or the like. In some examples, the primary material may include a nickel-based, iron-based, or titanium-based alloy that includes one or more alloying additions such as one or more of Mn, Mg, Cr, Si, Co, W, Ta, Al, Ti, Hf, Re, Mo, Ni, Fe, B, Nb, V, C, and Y. In some examples, the primary material may include a polycrystalline nickel-based superalloy or a polycrystalline cobalt-based superalloy, such as an alloy including NiCrAlY or CoNiCrAlY. For example, the metal or alloy may include an alloy that includes 9 to 10.0 wt. % W, 9 to 10.0 wt. % Co, 8 to 8.5 wt. % Cr, 5.4 to 5.7 wt. % Al, about 3.0 wt. % Ta, about 1.0 wt. % Ti, about 0.7 wt. % Mo, about 0.5 wt. % Fe, about 0.015 wt. % B, and balance Ni, available under the trade designation MAR-M-247, from MetalTek International, Waukesha, Wis. In some examples, the metal or alloy may include an alloy that includes 22.5 to 24.35 wt. % Cr, 9 to 11 wt. % Ni, 6.5 to 7.5 wt. % W, less than about 0.55 to 0.65 wt. % of C, 3 to 4 wt. % Ta, and balance Co, available under the trade designation MAR-M-509, from MetalTek International. In some examples, the metal or alloy may include an alloy that includes 19 to 21 wt. % Cr, 9 to 11 wt. % Ni, 14 to 16 wt. % W, about 3 wt. % Fe, 1 to 2 wt. % Mn, and balance Co, available under the trade designation L605, from Rolled Alloys, Inc., Temperance, Mich. In some examples, a metal or alloy may include a chemically modified version of MAR-M-247 that includes less than 0.3 wt. % C, between 0.05 and 4 wt. % Hf, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20. % Ta, and between 0.01 and 10 wt. % Ti. In some examples, the metal or alloy may include a nickel based alloy available under the trade designation IN-738 or Inconel 738, or a version of that alloy, IN-738 LC, available from All Metals & Forge Group, Fairfield, N.J., or a chemically modified version of IN-738 that includes less than 0.3 wt. % C, between 0.05 and 7 wt. % Nb, less than 8 wt. % Re, less than 8 wt. % Ru, between 0.5 and 25 wt. % Co, between 0.0001 and 0.3 wt. % B, between 1 and 20 wt. % Al, between 0.5 and 30 wt. % Cr, less than 1 wt. % Mn, between 0.01 and 10 wt. % Mo, between 0.1 and 20 wt. % Ta, between 0.01 and 10 wt. % Ti, and a balance Ni. In some examples, the metal or alloy may include may include an alloy that includes 5.5 to 6.5 wt. % Al, 13 to 15 wt. % Cr, less than 0.2 wt. % C, 2.5 to 5.5 wt. % Mo, Ti, Nb, Zr, Ta, B, and balance Ni, available under the trade designation IN-713 from MetalTek International, Waukesha, Wi.

In some examples, the primary material may include a refractory metal or a refractory metal alloy, such as molybdenum or a molybdenum alloy (such as a titanium-zirconium-molybdenum or a molybdenum-tungsten alloy), tungsten or a tungsten alloy (such as a tungsten-rhenium alloy or an alloy of tungsten and nickel and iron or nickel and copper), niobium or a niobium alloy (such as a niobium-hafnium-titanium alloy), tantalum or a tantalum alloy, rhenium or a rhenium alloy, or combinations thereof.

In some examples, the primary material may include a ceramic, such as a nitride, carbide, or oxide, or carbon. Suitable ceramic materials include, for example, a silicon-containing ceramic, such as silica ($SiO_2$), silicon carbide (SiC), and/or silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples, the ceramic functions as a reinforcement material in a final component formed from the filament. The primary material thus may include continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like, within filament 20. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

In some examples, the primary material may include a metal or alloy and a ceramic. For example, the primary material may include an oxide-dispersion strengthened (ODS) alloy. The ODS alloy may include at least one of a superalloy or a particle-dispersion strengthened alloy. ODS alloys are alloys strengthened through the inclusion of a fine dispersion of oxide particles. For example, an ODS alloy may include a high temperature metal matrix (e.g., any of the metals or alloys described above) that further include oxide nanoparticles, for example, yttria ($Y_2O_3$). Other example ODS alloys include nickel chromium ODS alloys, thoria-dispersion strengthened nickel and nickel chromium alloys, nickel aluminide and iron aluminide ODS alloys, iron chromium aluminide ODS alloys. Other strengthening particles may include alumina, hafnia, zirconia, beryllia, magnesia, titanium oxide, and carbides including silicon carbide, hafnium carbide, zirconium carbide, tungsten carbide, and titanium carbide.

Powders or particulates including ODS alloys may be formed by, for example, mixing a plurality of particles of metal(s) and oxide(s) forming the ODS alloy to form a mixture, optionally melting at least part of the mixture to form a melted mixture including oxide particles, and, if the mixture is melted, atomizing the melted mixture into the powdered form. Alternatively, the powdered form of the ODS alloy may be provided by hydrometallurgical processes, or any suitable technique for preparing an ODS alloy.

In some examples, ODS alloys may be characterized by the dispersion of fine oxide particles and by an elongated grain shape, which may enhance high temperature deformation behavior by inhibiting intergranular damage accumulation.

Filament 20 also includes a binder. The binder is configured to bind together the primary material (e.g., the powder, particles, whiskers, platelets, fibers, a continuous monofilament or multifilament two-dimensional or three-dimensional weave, braid, fabric, or the like) to form filament 20. The primary material may be dispersed in the binder, for example substantially uniformly dispersed in the binder. The binder may eventually be at least partially removed, e.g., by heating during sintering to form a sintered component that includes the primary material.

In accordance with example techniques of this disclosure, the binder is also selected to release a secondary material upon being heated at or above a conversion temperature, which is a temperature at which the binder releases the secondary material. In some examples, the binder releases the secondary material by reacting or otherwise degrading (e.g., decomposing) to release the secondary material from the binder. In other examples, the binder includes multiple components, and one of the components is released from the binder upon reaction or degradation of another component of the binder.

The secondary material may include a reactive element, an alloying element, a ceramic, or the like. For example, the secondary material may include an alloying element such as carbon, nitrogen, silicon, or the like. As another example, the secondary material may include a ceramic such as silica, silicon carbide, silicon oxycarbide, silicon nitride, silicon carbonitride, silicon oxynitride, or the like.

In some examples, the binder may include a polymer. Example polymers include polyvinyl alcohol (PVA), polyolefins (POs), polyacrylonitrile (PAN), polystyrene (PS), acrylonitrile butadiene styrene (ABS), polylactic acid (PLA), thermoplastic polyurethanes (TPOs), polyamides, furan resins, silicones, or the like, or combinations thereof.

In some examples, the polymer is configured to degrade to release the secondary material upon heating being heated at or above a conversion temperature. For example, PAN may react (e.g., degrade) upon heating to release carbon and/or nitrogen, a furan resin may react (e.g., degrade) upon heating to release carbon, a silicone may react (e.g., degrade) upon heating to release silicon, and polyacrylonitrile (PAN) may react (e.g., degrade) upon heating to release nitrogen and/or carbon.

In other examples, the polymer includes a pre-ceramic polymer configured to react (e.g., convert) to a ceramic upon heating at or above the conversion temperature. For example, the polymer may include a polycarbosilane configured to react (e.g., convert) to silicon carbide upon heating at or above the conversion temperature. As another example, the polymer may include a polysiloxane, a polysilsesquioxane, or a polycarbosiloxane configured to react (e.g., convert) to silicon oxycarbide upon heating at or above the conversion temperature. As another example, the polymer may include a polysilylcarbodiimide, a polysilsequicarbodiimide, a polysilsesquiazane, or a polysilazane configured to react (e.g., convert) to silicon carbonitride upon heating at or above the conversion temperature. As another example, the polymer may include a metal-containing polysiloxane configured to react (e.g., convert) to a metal-containing silicon oxycarbide upon heating at or above the conversion temperature. As another example, the polymer may include a metal-containing polycarbosilane configured to react (e.g., convert) to a metal-containing silicon carbide upon heating at or above the conversion temperature. As another example, the polymer may include a metal-containing polysilazane configured to react (e.g., convert) to a metal-containing silicon carbonitride upon heating at or above the conversion temperature. In some examples, the metal-containing polymers may include organometallic-containing polymers, such as metallocene-containing polymers, such as a ferrocene-containing polymer, a nickelocene-containing polymer, a titanocene-containing polymer, a cobaltocene-containing polymer, a ruthenocene-containing polymer, a zircocene-containing polymer, an osmocene-containing polymer, or the like.

In other examples, rather than the metallocene being part of the polymer, the metallocene may be a separate chemical constituent mixed with the polymer. Other example organometallics include organometallic rhodium(III), organometallic iridium(III), or the like.

Filament 20 includes a selected amount of binder and primary material so that the material in roads 26 may include more than about 80% by volume of the primary material, which may result in a substantially rigid component with reduced porosity being formed in response to removal of the binder. In some examples, filament 20 includes binder in an amount configured to cause the material to shrink by less than about 20 volume percent relative to an initial volume of the material in response to removing the binder. For example, filament 20 may include less than about 20% by volume of the binder. The amount of binder also may be selected such that a desired amount of secondary material is released upon heating of the binder at or above the conversion temperature.

In some examples, filament 20 includes at least one shrink-resistant agent. For example, the at least one shrink-resistant agent may include a ceramic, instead of, or in addition to, the oxide in any ODS present in the material(s).

Figure 2:
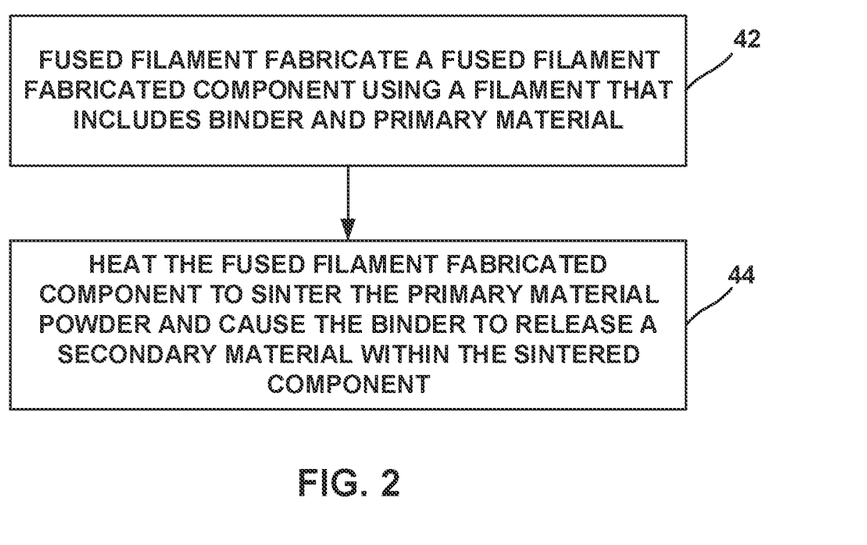
FIG. 2 is a flow diagram illustrating an example technique for forming a fused filament fabricated component using a filament that includes a primary material and a binder configured to release a secondary material.

An example technique that may be implemented by system 10 will be described with concurrent reference to FIG. 2. FIG. 2 is a flow diagram illustrating an example technique for forming a fused filament fabricated component using a filament that includes a primary material and a binder configured to release a secondary material. Although the technique of FIG. 2 is described with respect to system 10 of FIG. 1, in other examples, the technique of FIG. 2 may be performed by other systems, such a system including fewer or more components than those illustrated in FIG. 1. Similarly, system 10 may be used to performed other additive manufacturing techniques.

The technique of FIG. 2 includes fused filament fabricating a fused filament fabricated component that includes a primary material and a binder configured to release a secondary material (42). Fused filament fabricating the fused filament fabricated component (42) may include positioning substrate 30 including surface 28 adjacent to a build position, e.g., on stage 18. In some examples, system 10 may not include a separate substrate 30, and the technique of FIG. 2 may include positioning a build surface defined by stage 18, or by another component, or layers of prior softened filament 24 or another material.

Fused filament fabricating the fused filament fabricated component (42) also may include forming a road 26 of material using fused filament fabrication. Computing device 12 may cause filament delivery device 14 to deposit softened filament 24 in one or more roads 26 to ultimately form the fused filament fabricated component. A plurality of roads 26 defining a common plane may define a layer of material. Thus, successive roads 26 may define a series of layers, for example, parallel layers, and the series of layers may eventually define the additively manufactured component.

Fused filament fabricating the fused filament fabricated component (42) additionally may include forming, on roads 26 of material, at least one additional layer of material to form the fused filament fabricated component. For example, computing device 12 may control movement and positioning of filament delivery device 14 relative to stage 18, and vice versa, to control the locations at which roads 26 are formed. Computing device 12 may control movement of filament delivery device 14, stage 18, or both, based on a computer aided manufacturing or computer aided design (CAM/CAD) file. For example, computing device 12 may control filament delivery device 14 to trace a pattern or shape to form a layer including a plurality of roads 26 on surface 28. Computing device 12 may control filament delivery device 14 or stage 18 to move substrate 30 away from filament delivery device 14, then control filament delivery device 14 to trace a second pattern or shape to form a second layer including a plurality of roads on the previously deposited layer. Computing device 12 may control stage 18 and filament delivery device 14 in this manner to result in the plurality of layers, each layer including a traced shape or design. Together, the plurality of layers defines a fused filament fabricated component (42).

The technique of FIG. 2 includes, after forming the fused filament fabricated component (42), heating the fused filament fabricated component to sinter the primary material and cause the binder to release the secondary material within the sintered component (44). For example, the fused filament fabricated component may be placed in a furnace to heat the fused filament fabricated component and cause sintering of the primary material and release of the secondary material from the binder (44).

The heating may include any thermal treatment, for example, one or more predetermined cycles of exposure to predetermined temperatures for predetermined times. The predetermined temperature may include a temperature at or above a conversion temperature of the binder. As described above, the conversion temperature may be a temperature at which the binder reacts (e.g., degrades, combusts, converts from a polymer to a ceramic, or the like) to release the secondary material. In some examples, the remainder of the binder (other than the secondary material) is substantially removed during the heating at or above the conversion temperature. For example, as PAN is heated to convert to carbon, the remaining elements (e.g., nitrogen, hydrogen) may be released as gas that escapes through porosity in the additively manufactured component (e.g., between particles of the primary material). This may result in substantially only the secondary material being left from the binder, and the component that is being sintered including substantially only the primary material and the secondary material.

Sintering may promote the bonding of primary material to each other to strengthen the component. In some examples, sintering may also promote bonding of primary material and secondary material (e.g., in implementations in which the secondary material is a ceramic). Sintering may not melt the primary material (and/or secondary material), thus leaving the microstructure of the primary material (and/or secondary material) substantially intact. This may facilitate forming components with selected microstructures compared to techniques that include melting the primary material. Sintering may also densify an interior and/or a surface region of the component, for example, by promoting compaction and reducing porosity.

In examples in which the secondary material is a reactive element or an alloying element, heating the fused filament fabricated component to sinter the primary material and cause the binder to release the secondary material within the sintered component (44) also may cause diffusion of the reactive element or alloying element within the primary material. This may effect metallurgical changes to the primary material at regions into which the secondary material diffuses. For example, diffusion of carbon, silicon, or nitrogen into the primary material may effect case hardening of the primary material to form a more wear-resistant region.

Figure 3:
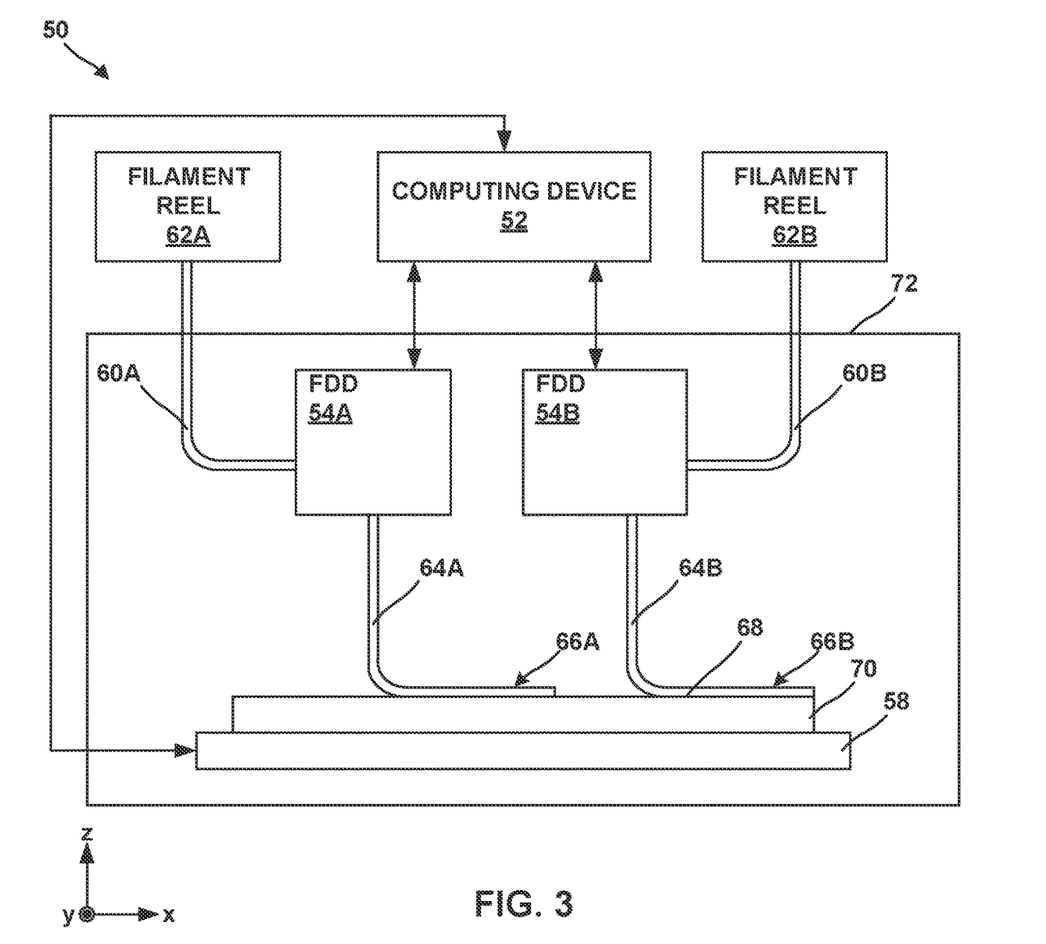
FIG. 3 is a conceptual block diagram illustrating an example system for forming an additively manufactured component by fused filament fabrication of a first filament including a primary material and a binder and a second filament including the primary material and a sacrificial binder.

In some examples, the secondary material may only be desired or useful in selected regions of a component. To accomplish this, a component may be fused filament fabricated using two filaments, one filament with a binder configured to release a secondary material and one filament with a sacrificial binder configured to be substantially fully removed. FIG. 3 is a conceptual block diagram illustrating an example system 50 for forming an additively manufactured component by fused filament fabrication of a first filament 60A including a primary material and a binder and a second filament 60B including the primary material and a sacrificial binder.

System 50 may be similar in many respects to system 10 of FIG. 1. For example, system 50 may include computing device 52, filament delivery devices 54A and 54B (collectively, "filament delivery devices 54"), filament reels 62A and 62B (collectively, "filament reels 62"), stage 58, substrate 70, and enclosure 72. Each of these components may be similar to or substantially the same as the corresponding components illustrated in FIG. 1.

Unlike system 10 of FIG. 1, system 50 includes two filaments reels 62 and two filament delivery devices 54. First filament reel 62A holds a first filament 60A that is delivered to first filament delivery device 54A. First filament 60A may be similar or substantially the same as filament 20 illustrated in FIG. 1, i.e., first filament 60A may include a primary material and a binder configured to release a secondary material upon heating at or above a conversion temperature.

System 50 also includes a second filament reel 62B that holds a second filament 60B that is delivered to second filament delivery device 54B. Second filament 60B also includes the primary material, but includes a sacrificial binder instead of a binder configured to release a secondary material upon heating at or above a conversion temperature. A sacrificial binder is configured to be substantially fully removed prior to heating the fused filament fabricated component to sinter the primary material and cause the binder to release the secondary material.

The sacrificial binder may include a polymer, such as a thermoplastic. Example thermoplastics include polyvinyl alcohol, polyolefins, polystyrene, acrylonitrile butadiene styrene, polylactic acid, thermoplastic polyurethanes, aliphatic polyamides, or the like, or combinations thereof. In examples in which both the binder and the sacrificial binder include a polymer, the polymers may be different such that the sacrificial binder may be substantially fully removed (e.g., using heat or chemical removal) while leaving the binder intact. For example, the sacrificial binder may be selected to be removable using an acid vapor, while the binder is substantially inert to the acid vapor, thus leaving the binder substantially intact. As another example, the sacrificial binder may decompose at a temperature at which the binder is left substantially unaffected. In this way, the sacrificial binder may be removed prior to the heating the fused filament fabricated component to sinter the primary material and cause the binder to release the secondary material. The primary material may be dispersed in the sacrificial binder, for example substantially uniformly dispersed in the sacrificial binder.

In some examples, the sacrificial binder may be in the form of a curable polymer precursor. The curable polymer precursor may be curable (for example, thermally curable or photocurable) to form the sacrificial binder. For example, the curable polymer precursor may be cured as softened filament 64B is extruded and/or after softened filament 64B are laid down in roads 66B including the primary material dispersed in the sacrificial binder, for example substantially uniformly dispersed in the sacrificial binder. The curable polymer precursor may include a precursor, for example, one or more monomers, oligomers, or non-crosslinked polymers suitable for forming the polymeric material of the sacrificial binder upon curing. Thus, in some examples, an energy source (shown in FIG. 1 but not FIG. 3) may direct energy at a curable polymer precursor, for example, in the material, to selectively cure the curable polymer precursor to form roads 66B including the primary material and the sacrificial binder. In other examples, the heat to which the composition is exposed to form softened filaments 64B may initiate the curing reaction, and no additional energy source is used.

Second filament 60B includes a selected amount of sacrificial binder and primary material so that the material in roads 66B may include more than about 80% by volume of the primary material, which may result in a substantially rigid component with reduced porosity being formed in response to removal of the sacrificial binder. In some examples, second filament 60B includes sacrificial binder in an amount configured to cause the material to shrink by less than about 20 volume percent relative to an initial volume of the material in response to removing the sacrificial binder. For example, second filament 60B may include less than about 20% by volume of the sacrificial binder.

In some examples, second filament 60B includes at least one shrink-resistant agent. For example, the at least one shrink-resistant agent may include a ceramic, instead of, or in addition to, the oxide in any ODS present in the material(s).

By using two filaments 60A and 60B, both including the primary material but including different binders, system 50 may be configured to fused filament fabricate a component that includes the secondary material at selected regions or locations and omits the secondary material at other selected regions or locations. For example, computing device 52 may control first filament delivery device 54A to deposit first softened filament 64A in roads 66A at locations at which primary and secondary material is desired (e.g., near surfaces of the component to be formed) and control second filament delivery to deposit second softened filament 64B in roads 66B at locations at which only primary material is desired (e.g., within the volume of the component to be formed). By using the same primary material in both the first and second filaments 60A and 60B, the material may sinter at a substantially similar temperature and shrink a substantially similar amount, which may reduce manufacturing complexity and cost. In this way, the secondary material may be effectively incorporated in the component at selected locations with reduced manufacturing cost and complexity.

Figure 4:
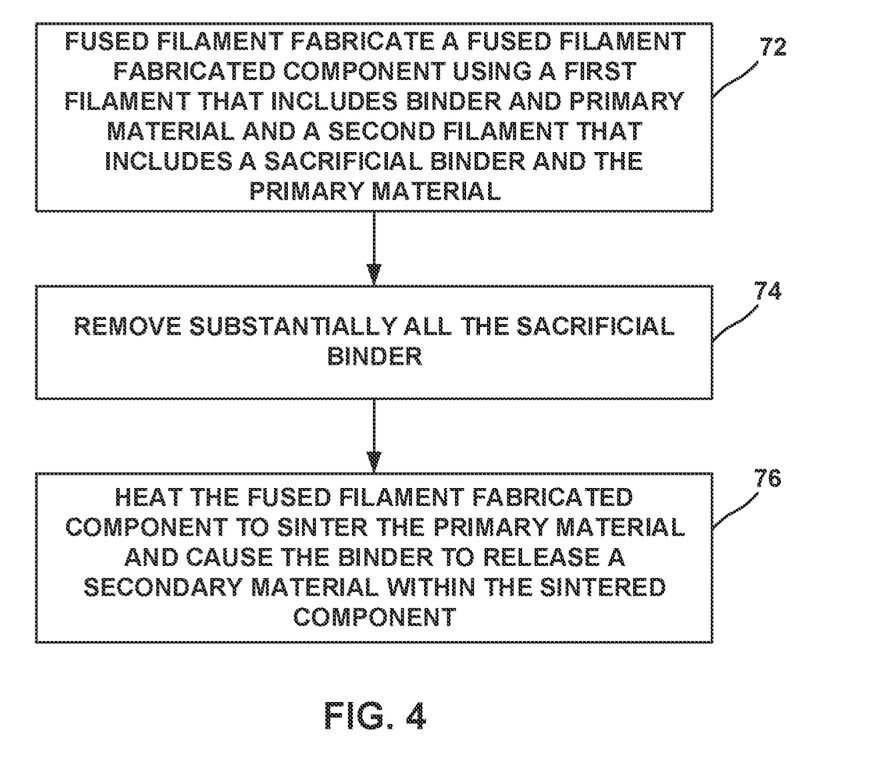
FIG. 4 is a flow diagram illustrating an example technique for forming a fused filament fabricated component using a first filament that includes a primary material and a binder configured to release a secondary material and a second filament that includes the primary material and a sacrificial binder.

FIG. 4 is a flow diagram illustrating an example technique for forming a fused filament fabricated component using a first filament that includes a primary material and a binder configured to release a secondary material and a second filament that includes the primary material and a sacrificial binder. Although the technique of FIG. 4 is described with respect to system 50 of FIG. 3, in other examples, the technique of FIG. 4 may be performed by other systems, such a system including fewer or more components than those illustrated in FIG. 3. Similarly, system 50 may be used to performed other additive manufacturing techniques.

The technique of FIG. 4 includes fused filament fabricating a fused filament fabricated component using a first filament 60A that includes a primary material and a binder configured to release a secondary material and a second filament 60B that includes the primary material and a sacrificial binder (72). Fused filament fabricating the fused filament fabricated component (72) may include positioning substrate 70 including surface 68 adjacent to a build position, e.g., on stage 58. In some examples, system 50 may not include a separate substrate 70, and the technique of FIG. 4 may include positioning a build surface defined by stage 58, or by another component, or layers of prior softened filament 64A and 64B or another material.

Fused filament fabricating the fused filament fabricated component (72) also may include forming at least one first road 66A of the first filament using fused filament fabrication. Computing device 52 may cause first filament delivery device 54A to deposit first softened filament 64A in one or more first roads 66A at selected locations to ultimately form part of the fused filament fabricated component. Computing device 52 also may cause second filament delivery device 54B to deposit second softened filament 64B in one or more second roads 66B at other selected locations to ultimately form part of the fused filament fabricated component. The selected locations for the first softened filament 64A and second softened filament 64B may be selected based on locations at which the second material is desired, e.g., computing device 52 may control first filament delivery device 54A to deliver first softened filament 64A to locations at which the second material is desired and control second filament delivery device 54B to deliver second softened filament 64B to locations at which the second material is not desired. The locations at which computing device 52 causes the first softened filament 64A and second softened filament 64B to be delivered may be defined by a build file. A plurality of roads (of first filament 60A and/or second filament 60B) defining a common plane may define a layer of material. Thus, successive roads 66 may define a series of layers, for example, parallel layers, and the series of layers may eventually define the additively manufactured component.

Figure 5:
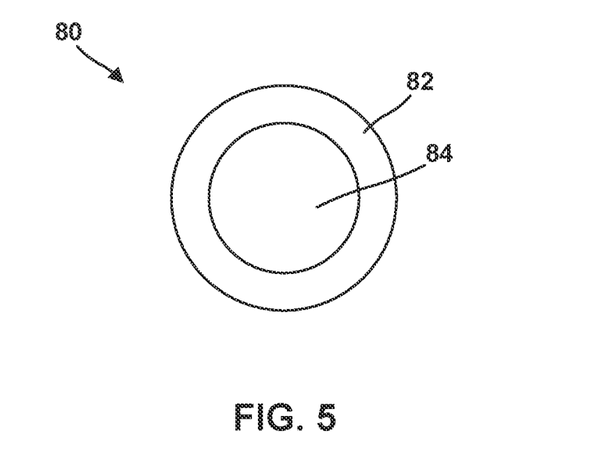
FIG. 5 is a conceptual diagram illustrating an example fused filament fabricated component that includes a first filament at a first set of selected locations and a second filament at a second set of selected locations.

Fused filament fabricating the fused filament fabricated component (72) additionally may include forming, on roads 66 of material, at least one additional layer of material (e.g., first filament 60A, second filament 60B, or both) to form the fused filament fabricated component. An example of the resulting component 80 is shown in FIG. 5, in which a first set of locations 82 includes the first filament 60A and a second set of locations 84 includes the second filament 60B. Component 80 is an example in which the first filament (which releases the second material when heated at or above a conversion temperature) is located at or near a surface of component 80. This results in the second material being present at or near the surface of component 80 after the heating step which causes the second material to be released. This may be beneficial for improved wear properties when the second material includes a ceramic, or an alloying element such as carbon, nitrogen, or silicon, which act as case hardening agents for metals or alloys.

Once computing device 52 has controlled first filament delivery device 54A and second filament delivery device 54B to deposit first filament 60A and second filament 60B at all selected locations, the fused filament fabricated component may be complete. The technique of FIG. 4 then includes removing substantially all of the sacrificial binder in second filament 60B (74). As described above, the sacrificial binder may be removed using, for example, heat, a chemical (e.g., an acid), or the like. The method of removal may be selected such that the sacrificial binder is substantially fully removed while the binder in first filament 60A is left substantially intact. This allows the binder to be available to release the secondary material during the subsequent sintering step.

Once the sacrificial binder has been substantially fully removed, the fused filament fabricated component may be heated to sinter the primary material and cause the binder to release the secondary material within the sintered component (76). This step may be similar to or substantially the same as step (44) described with reference to FIG. 2.

Clause 1. A method comprising: fused filament fabricating a fused filament fabricated component by delivering a softened filament to selected locations at or adjacent to a build surface, wherein the softened filament comprises a binder and a primary material, wherein the binder is configured to release a secondary material upon heating at or above a conversion temperature; and heating the fused filament fabricated component to a temperature at or above the conversion temperature to sinter the primary material to form a sintered part and cause the binder to release the secondary material within the sintered part.

Clause 2. The method of clause 1, wherein the primary material comprises a powder comprising a metal or an alloy.

Clause 3. The method of clause 1 or 2, wherein the primary material comprises a ceramic.

Clause 4. The method of any one of clauses 1 to 3, wherein the secondary material comprises carbon, and wherein the binder is configured to release carbon upon heating at or above the conversion temperature.

Clause 5. The method of clause 4, wherein the binder comprises a high char yielding binder.

Clause 6. The method of any one of clauses 1 to 5, wherein the secondary material comprises nitrogen, and wherein the binder is configured to release nitrogen upon heating at or above the conversion temperature.

Clause 7. The method of clause 6, wherein the binder comprises a polyamide.

Clause 8. The method of any one of clauses 1 to 7, wherein the secondary material comprises silicon, and wherein the binder is configured to release silicon upon heating at or above the conversion temperature.

Clause 9. The method of clause 8, wherein the binder comprises a silicone polymer.

Clause 10. The method of any one of clauses 1 to 9, wherein the secondary material comprises a ceramic, and wherein the binder comprises a preceramic polymer.

Clause 11. The method of any one of clauses 1 to 10, wherein the secondary material comprises a metal, and wherein the binder comprises an organometallic compound.

Clause 12. The method of any one of clauses 1 to 11, wherein the softened filament comprises a first softened filament, and wherein the first softened filament is delivered to a first set of selected locations, the method further comprising delivering a second softened filament to a second set of selected locations at or adjacent to the build surface, wherein the second softened filament comprises a sacrificial binder and the primary material, and wherein the sacrificial binder is configured to be substantially fully removed from the fused filament fabricated component.

Clause 13. The method of clause 12, wherein the first set of locations include locations at or near a surface of the fused filament fabricated component, and wherein the second set of locations include locations within a bulk volume of the fused filament fabricated component.

Clause 14. A filament for fused filament fabrication, the filament comprising: a primary material; and a binder, wherein the binder is configured to release a secondary material upon heating at or above a conversion temperature.

Clause 15. The filament of clause 14, wherein the primary material comprises a powder comprising a metal or an alloy.

Clause 16. The filament of clause 14 or 15, wherein the primary material comprises a ceramic.

Clause 17. The filament of any one of clauses 14 to 16, wherein the secondary material comprises carbon, and wherein the binder is configured to release carbon upon heating at or above the conversion temperature.

Clause 18. The filament of clause 17, wherein the binder comprises a high char yielding binder.

Clause 19. The filament of any one of clauses 14 to 18, wherein the secondary material comprises nitrogen, and wherein the binder is configured to release nitrogen upon heating at or above the conversion temperature.

Clause 20. The filament of clause 19, wherein the binder comprises a polyamide

Clause 21. The filament of any one of clauses 14 to 20, wherein the secondary material comprises silicon, and wherein the binder is configured to release silicon upon heating at or above the conversion temperature.

Clause 22. The filament of clause 21, wherein the binder comprises a silicone polymer.

Clause 23. The filament of any one of clauses 14 to 22, wherein the secondary material comprises a ceramic, and wherein the binder comprises a preceramic polymer.

Clause 24. The filament of any one of clauses 14 to 23, wherein the secondary material comprises a metal, and wherein the binder comprises an organometallic compound.

Clause 25. A method comprising: fused filament fabricating a fused filament fabricated component by delivering a softened filament to selected locations at or adjacent to a build surface, wherein the softened filament comprises a binder and a powder comprising a metal or alloy, wherein the binder is configured to release an alloying element upon heating at or above a conversion temperature; and heating the fused filament fabricated component to a temperature at or above the conversion temperature to sinter the powder to form a sintered part and cause the binder to release the alloying element within the sintered component.

Clause 26. The method of clause 25, wherein the alloying element comprises carbon, and wherein the binder is configured to release carbon upon heating at or above the conversion temperature.

Clause 27. The method of clause 26, wherein the binder comprises a high char yielding binder.

Clause 28. The method of any one of clauses 25 to 27, wherein the alloying element comprises nitrogen, and wherein the binder is configured to release nitrogen upon heating at or above the conversion temperature.

Clause 29. The method of clause 28, wherein the binder comprises a polyamide.

Clause 30. The method of any one of clauses 25 to 29, wherein the alloying element comprises silicon, and wherein the binder is configured to release silicon upon heating at or above the conversion temperature.

Clause 31. The method of clause 30, wherein the binder comprises a silicone polymer.

Clause 32. The method of any one of clauses 25 to 31, wherein the alloying element comprises a metal, and wherein the binder comprises an organometallic compound.

Clause 33. The method of any one of clauses 25 to 32, wherein the softened filament comprises a first softened filament, and wherein the first softened filament is delivered to a first set of selected locations, the method further comprising delivering a second softened filament to a second set of selected locations at or adjacent to the build surface, wherein the second softened filament comprises a sacrificial binder and the metal or alloy powder, and wherein the sacrificial binder is configured to be substantially fully removed from the fused filament fabricated component.

Clause 34. The method of clause 33, wherein the first set of locations include locations at or near a surface of the fused filament fabricated component, and wherein the second set of locations include locations within a bulk volume of the fused filament fabricated component.

Clause 35. A filament for fused filament fabrication, the filament comprising: a powder comprising a metal or alloy; and a binder, wherein the binder is configured to release an alloying element upon heating at or above a conversion temperature.

Clause 36. The filament of clause 35, wherein the alloying element comprises carbon, and wherein the binder is configured to release carbon upon heating at or above the conversion temperature.

Clause 37. The filament of clause 36, wherein the binder comprises a high char yielding binder.

Clause 38. The filament of any one of clauses 35 to 37, wherein the alloying element comprises nitrogen, and wherein the binder is configured to release nitrogen upon heating at or above the conversion temperature.

Clause 39. The filament of clause 38, wherein the binder comprises a polyamide.

Clause 40. The filament of any one of clauses 35 to 39, wherein the alloying element comprises silicon, and wherein the binder is configured to release silicon upon heating at or above the conversion temperature.

Clause 41. The filament of clause 40, wherein the binder comprises a silicone polymer.

Clause 42. The filament of any one of clauses 35 to 41, wherein the alloying element comprises a metal, and wherein the binder comprises an organometallic compound.

Clause 43. A fused filament fabricated component comprising: a first filament at a first set of locations, wherein the first filament comprises a binder and a primary material, wherein the binder is configured to release a secondary material upon heating at or above a conversion temperature; and a second filament at a second set of locations, wherein the second filament comprises a sacrificial binder and the primary material, and wherein the sacrificial binder is configured to be substantially fully removed from the fused filament fabricated component.

Clause 44. The fused filament fabricated component of clause 43, wherein the primary material comprises a powder comprising a metal or an alloy.

Clause 45. The fused filament fabricated component of clause 43 or 44, wherein the primary material comprises a ceramic.

Clause 46. The fused filament fabricated component of any one of clauses 43 to 45, wherein the secondary material comprises carbon, and wherein the binder is configured to release carbon upon heating at or above the conversion temperature.

Clause 47. The fused filament fabricated component of clause 46, wherein the binder comprises a high char yielding binder.

Clause 48. The fused filament fabricated component of any one of clauses 43 to 47, wherein the secondary material comprises nitrogen, and wherein the binder is configured to release nitrogen upon heating at or above the conversion temperature.

Clause 49. The fused filament fabricated component of clause 48, wherein the binder comprises a polyamide.

Clause 50. The fused filament fabricated component of any one of clauses 43 to 49, wherein the secondary material comprises silicon, and wherein the binder is configured to release silicon upon heating at or above the conversion temperature.

Clause 51. The fused filament fabricated component of clause 50, wherein the binder comprises a silicone polymer.

Clause 52. The fused filament fabricated component of any one of clauses 43 to 51, wherein the secondary material comprises a ceramic, and wherein the binder comprises a preceramic polymer.

Clause 53. The fused filament fabricated component of any one of clauses 43 to 52, wherein the secondary material comprises a metal, and wherein the binder comprises an organometallic compound.

Clause 54. The fused filament fabricated component of any one of clauses 43 to 53, wherein the first set of locations include locations at or near a surface of the fused filament fabricated component, and wherein the second set of locations include locations within a bulk volume of the fused filament fabricated component.

Clause 55. A fused filament fabricated component comprising: a first filament at a first set of locations, wherein the first filament comprises a binder and a powder comprising a metal or alloy, wherein the binder is configured to release an alloying component upon heating at or above a conversion temperature; and a second filament at a second set of locations, wherein the second filament comprises a sacrificial binder and the powder, and wherein the sacrificial binder is configured to be substantially fully removed from the fused filament fabricated component.

Clause 56. The fused filament fabricated component of clause 55, wherein the alloying element comprises carbon, and wherein the binder is configured to release carbon upon heating at or above the conversion temperature.

Clause 58. The fused filament fabricated component of clause 56, wherein the binder comprises a high char yielding binder.

Clause 59. The fused filament fabricated component of any one of clauses 55 to 58, wherein the alloying element comprises nitrogen, and wherein the binder is configured to release nitrogen upon heating at or above the conversion temperature.

Clause 60. The fused filament fabricated component of clause 59, wherein the binder comprises a polyamide.

Clause 61. The fused filament fabricated component of any one of clauses 55 to 60, wherein the alloying element comprises silicon, and wherein the binder is configured to release silicon upon heating at or above the conversion temperature.

Clause 62. The fused filament fabricated component of clause 61, wherein the binder comprises a silicone polymer.

Clause 63. The fused filament fabricated component of any one of clauses 55 to 62, wherein the alloying element comprises a metal, and wherein the binder comprises an organometallic compound.

Clause 64. The fused filament fabricated component of any one of clauses 55 to 63, wherein the first set of locations include locations at or near a surface of the fused filament fabricated component, and wherein the second set of locations include locations within a bulk volume of the fused filament fabricated component.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
fused filament fabricating a fused filament fabricated component by at least:
  delivering a softened first filament to a first set of selected locations at or adjacent to a build surface, and
  delivering a softened second filament to a second set of selected locations at or adjacent to the build surface, wherein the softened first filament comprises a binder and a metal or alloy powder, wherein the binder is configured to release at least one of a secondary material or an alloying element upon heating at or above a conversion temperature, wherein the softened second filament comprises a sacrificial binder and the metal or the alloy powder, the sacrificial binder being different from the binder of the first filament, wherein the first set of locations where the softened first filament is delivered include locations at or near a surface of the fused filament fabricated component, and wherein the second set of locations where the softened second filament is delivered include locations within a bulk volume of the fused filament fabricated component such that the delivered softened first filament is located between the surface of the fused filament fabricated component and the softened second filament within the bulk volume of the fused filament fabricated component;
removing substantially all of the sacrificial binder of the delivered second filament from the fused filament fabricated component; and
heating the fused filament fabricated component to a temperature at or above the conversion temperature to sinter the metal or the alloy powder to form a sintered part and cause the binder to release the at least one of the secondary material or the alloying element within the sintered part, wherein the release of the secondary material or the alloying element with the heating is configured such that the sintered metal or the sintered alloy powder is case hardened at the locations at or near the surface of the sintered part but not the second set of locations within the bulk volume to increase a wear resistance of the sintered part at the locations at or near the surface.

2. The method of claim 1, wherein the first filament further comprises a ceramic.

3. The method of claim 1, wherein the secondary material comprises carbon, and wherein the binder is configured to release carbon upon heating at or above the conversion temperature.

4. The method of claim 3, wherein the binder comprises a high char yielding binder.

5. The method of claim 1, wherein the secondary material comprises nitrogen, and wherein the binder is configured to release nitrogen upon heating at or above the conversion temperature.

6. The method of claim 5, wherein the binder comprises a polyamide.

7. The method of claim 1, wherein the secondary material comprises silicon, and wherein the binder is configured to release silicon upon heating at or above the conversion temperature.

8. The method of claim 7, wherein the binder comprises a silicone polymer.

9. The method of claim 1, wherein the secondary material comprises a ceramic, and wherein the binder comprises a preceramic polymer.

10. The method of claim 1, wherein the secondary material comprises a metal, and wherein the binder comprises an organometallic compound.

11. The method of claim 1, wherein the alloying element comprises carbon, wherein the binder is configured to release carbon upon heating at or above the conversion temperature, and wherein the release of the carbon is configured to case harden the sintered metal or the sintered alloy powder at the locations at or near the surface of the sintered part to increase the wear resistance of the sintered part at the locations at or near the surface.

12. The method of claim 11, wherein the binder comprises a high char yielding binder.

13. The method of claim 1, wherein the alloying element comprises nitrogen, and wherein the binder is configured to release nitrogen upon heating at or above the conversion temperature, and wherein the release of the nitrogen is configured to case harden the sintered metal or the sintered alloy powder at the locations at or near the surface of the sintered part to increase the wear resistance of the sintered part at the locations at or near the surface.

14. The method of claim 13, wherein the binder comprises a polyamide.

15. The method of claim 1, wherein the alloying element comprises silicon, and wherein the binder is configured to release silicon upon heating at or above the conversion temperature.

16. The method of claim 1, wherein the alloying element comprises a metal, and wherein the binder comprises an organometallic compound.

17. The method of claim 1, wherein the release of the secondary material or the alloying element with the heating effects metallurgical changes in the sintered metal or the sintered alloy powder at the first set of selected locations of the sintered part.

* * * * *